United States Patent
Scholten

(10) Patent No.: US 7,126,956 B2
(45) Date of Patent: Oct. 24, 2006

(54) SYSTEM TO PROVIDE FRACTIONAL BANDWIDTH DATA COMMUNICATIONS SERVICES

(75) Inventor: Michael D. Scholten, Westford, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 994 days.

(21) Appl. No.: 10/092,064

(22) Filed: Mar. 5, 2002

(65) Prior Publication Data

US 2003/0169756 A1  Sep. 11, 2003

(51) Int. Cl.
H04L 12/28 (2006.01)
(52) U.S. Cl. .................... 370/412; 370/419; 370/392
(58) Field of Classification Search ............... 370/412, 370/236.1, 299; 709/250; 398/59; 375/233
See application file for complete search history.

(56) References Cited

U.S. PATENT DOCUMENTS

| | | | |
|---|---|---|---|
| 5,479,448 A * | 12/1995 | Seshadri | 375/267 |
| 5,563,806 A * | 10/1996 | Barry et al. | 702/190 |
| 5,615,340 A * | 3/1997 | Dai et al. | 709/250 |
| 6,078,733 A * | 6/2000 | Osborne | 709/250 |
| 6,718,139 B1 * | 4/2004 | Finan et al. | 398/59 |
| 6,778,602 B1 * | 8/2004 | Agazzi et al. | 375/233 |
| 2001/0031017 A1 * | 10/2001 | Bettts | 375/265 |
| 2003/0142764 A1 * | 7/2003 | Keevill et al. | 375/341 |
| 2003/0169756 A1 * | 9/2003 | Scholten | 370/412 |
| 2004/0156325 A1 * | 8/2004 | Perkins et al. | 370/299 |

* cited by examiner

Primary Examiner—Bob A. Phunkulh
(74) Attorney, Agent, or Firm—Weingarten, Schurgin, Gagnebin & Lebovici LLP

(57) ABSTRACT

A system to provide fractional bandwidth data transmission includes a network processor, physical layer device, or link layer device {"data device") and a plurality of link layer devices that are coupled to a plurality of input-output ports. The link layer devices are coupled in a serial daisy chain fashion and pass data via a plurality of data channels. The first linked layer device is coupled to the data device and receives data therefrom and the last linked layer device is coupled to the data device and transmits data thereto forming a ring network that includes all of the link layer devices and the data device. Data received from the data device is contained in data packets that contain a destination identifier and the data. Each link layer device receives input data packets and separates the data packets based on the destination identifier contained therein. Data packets having a destination identifier corresponding to one of the plurality of input-output ports coupled to that particular linked layer device are diverted to the identified input-output port. The remaining data, and any data generated by that link layer device, is provided to the next adjacent down-stream link layer device. Data flow control is provided in an upstream direction from one link layer device to the next adjacent up-stream link layer device as a plurality of status indicators that correspond to the plurality of data channels. Each link layer device is responsive to the plurality of status indicators by not transmitting data on data channels having a corresponding status indicator indicative that no data is to be transmitted.

10 Claims, 3 Drawing Sheets

US 7,126,956 B2

SYSTEM TO PROVIDE FRACTIONAL BANDWIDTH DATA COMMUNICATIONS SERVICES

BACKGROUND OF THE INVENTION

This invention relates to apparatus for providing data communication services, and in particular, to providing fractional bandwidth data communication services.

Data communication vendors typically sell data communication link bandwidth to end users in "full lot" quantities, i.e., an end user is required to purchase an entire unit of bandwidth. For example, an end user that desires to use any portion of a Gigabit Ethernet (GBE) link is required to purchase the entire 1.25 Gigabit per second (GBPS) bandwidth thereof. In some instances however, an entire unit of bandwidth of a data communications link may exceed the required bandwidth of the data to be transmitted by the end user. In this case, the end user is unable to make use of the entire purchased bandwidth resulting in a waste of economic resources of the end user and a waste of bandwidth for the service provider. Having to purchase an entire GBE link may discourage some end users from purchasing bandwidth from a high capacity data link provider. As an alternative, a end user may purchase a full unit of bandwidth from a data communications provider that utilizes smaller bandwidths, i.e., lower capacity data links, thus foregoing the advantages of a higher bandwidth data connection that may provide the end user with a competitive advantage.

In another situation where the difference between the aggregate bandwidth and the full rate data bandwidth of the client I/O module ports can result in a number of ports that can be aggregated into a single higher capacity link. For example, in a ESCON/SONET example, a single 12-port ESCON device could aggregate all 12 ports into a single 2.5 Gb/s OC-48 device, but it may be more attractive to use 4 ESCON devices to aggregate 48 ports into a single 10 Gb/s device.

Currently, the public switched telephone network (PSTN) uses synchronous optical networking (SONET) links that operate at a data rate of approximately 10 GBPS using a single OC-192 link or four OC-48 links. Typically, a telecommunications service provider will aggregate the data of two or more end users together in order to maximize the use of the available bandwidth on the PSTN. In the case of end users operating GBE links at approximately 1 GBPS, a maximum of 10 end users may be aggregated together to form a 10 GBPS signal for transmission across the PSTN. If one or more end users are unable to fully utilize their portion of the 10 GBPS bandwidth, neither the telecommunications provider nor the end user is maximizing the use of the available bandwidth.

The ability to provide fractional portions of high bandwidth capacity links, such as GBE links, to end users would allow them to utilize the advantages of high bandwidth data communications systems without requiring the end users to purchase bandwidth in full unit quantities. The data communications vendors would achieve a more efficient use of the available bandwidth as well, in addition to increasing the number of clients making use of their service. Thus, offering fractional bandwidths of high capacity links would offer advantages to both the suppliers of data communications services and the consumers those services.

However as discussed above, the currently existing equipment is not designed to accommodate fractional bandwidth usage. The development of new equipment to accommodate fractional bandwidth use by end users is both expensive and time consuming. Merely scaling the existing equipment to allow addition of many more users through adding additional input-output ports is not a viable alternative. Adding additional input-output ports to the existing equipment designs will require a much higher pin count than current equipment allows to accommodate the new users. In addition, each of the added input-output ports will require an additional interface circuit associated with each port, larger internal multiplexers and more memory. This additional circuitry will result in a larger chip area, more power and heat to dissipate, and an increase in the cost of the chips.

Therefore, it would be advantageous to provide for the aggregation of users to make use of a fractional high capacity data communication environment using existing equipment that does not require an increase in pin count, power dissipation, and additional circuitry.

BRIEF SUMMARY OF THE INVENTION

A system to provide fractional bandwidth data transmission includes a network processor, physical layer device, or link layer device }"data device") and a plurality of link layer devices, each of which is coupled to a plurality of input-output ports, wherein each of the input-output ports has a unique identifier. The link layer devices are coupled in a serial daisy chain fashion and pass data via a plurality of data channels. The first link layer device is coupled to the data device and receives data therefrom, and the last link layer device is coupled to the data device and transmits data thereto. The plurality of serially linked daisy chained link layer devices forms a ring network that includes all of the link layer devices and the data device. Data transferred among the link layer devices and the data device is in the form of data packets that contain a destination identifier portion and a data portion. The destination identifier portion identifies the destination particular input-output port of the data.

Each link layer device receives input data packets and diverts each data packet to a virtual data channel corresponding to the destination identifier contained therein. Data packets having a destination identifier corresponding to one of the plurality of input-output ports coupled to that particular linked layer device are diverted to the identified input-output port. The remaining data, and any data generated by that link layer device, is provided to the next adjacent down-stream link layer device. Data flow control is provided in an upstream direction from one link layer device to the next adjacent up-stream link layer device as a plurality of status indicators that correspond to the plurality of data channels. Each link layer device is responsive to the plurality of status indicators by not transmitting data on data channels having a corresponding status indicator indicative that no data is to be transmitted.

In one embodiment, the link layer device includes, a data receiver coupled to an input data line, a channel mapper coupled to the data receiver, a received data FIFO and a feed-forward FIFO coupled to the channel mapper. The channel mapper receives the plurality of received data packets and diverts the received data packets, which have a destination identifier equivalent to a input-output port identifier associated with the link layer device, to the received data FIFO. The channel mapper diverts the remaining data packets to the feed-forward data FIFO corresponding to the unique destination identifier. A transmitter data FIFO, which contains a plurality of data packets for transmission, is coupled to a data transmitter. The data transmitter has an output coupled to an output data line, and a pair of inputs, one input is coupled to the feed-forward data FIFO and the second input is coupled to a data transmitter data FIFO. The data transmitter is configured and arranged to retrieve data packets from the feed-forward data FIFO and the transmitter data FIFO and to transmit the retrieved data packets on the output data line.

Other forms, features and aspects of the above-described methods and system are described in the detailed description that follows.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

Figure 1:
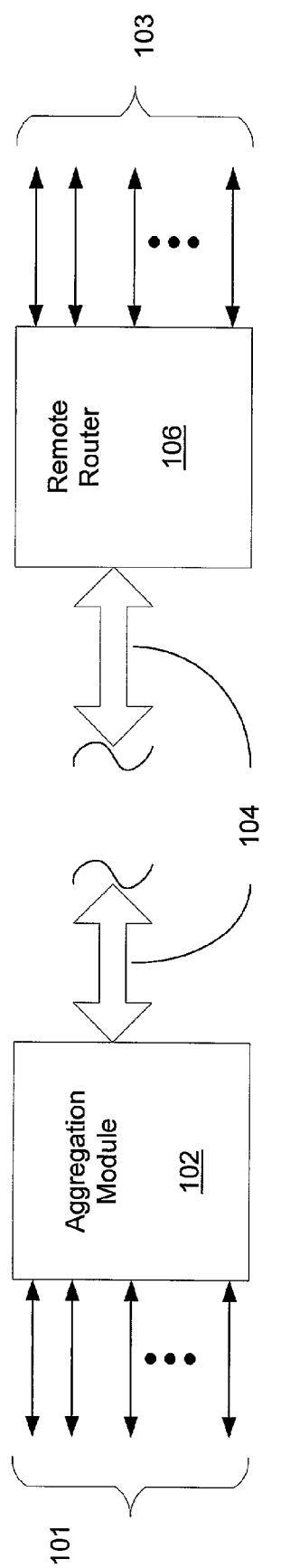
FIG. 1 is a block diagram of a data aggregation apparatus.

FIG. 1 depicts a high capacity data communication system that enables end users to use a fraction of a full lot of available bandwidth. In particular, FIG. 1 depicts a plurality of input-output ports 101 that are coupled to an aggregation module 102 that is further coupled to a network 104. The aggregation module 102 provides data channels to and from each of the plurality of input-output ports 101 and a high capacity network 104, wherein each channel corresponds to a particular input-output port. Each input-output port is configured and arranged to transmit and receive data packets, wherein each data packet includes a destination identifier and data. The destination identifier portion corresponds to the desired destination of a particular data packet and the data portion is the data to be delivered to the destination. The destination identifier may include one of the plurality of input-output ports 101 coupled to the data aggregation module 102 or a port that is remote to the aggregation module 102. In particular, when transmitting data across the network 104, aggregation module 102 aggregates the lower bandwidth data packets received from the plurality of input-output ports into a higher bandwidth data signal for transmission via the high capacity network 104. In one embodiment, the network 104 can be the public switched telephone network (PSTN) using a synchronous optical network (SONET) OC-192 link or 4 OC-48 links operating at approximately 10 Giga bit per second (GBPS) data rate. Thus, as will be explained in more detail below, the sum of the aggregated bandwidths of the data provided by the plurality of input-output ports 101 is less than or equal to the 10 GBPS data rate of the PSTN. The PSTN network 104 provides the interconnection of the plurality of input-output ports 101, via the aggregation module 102, to remote locations.

The aggregation module 102 also receives incoming aggregated data packets from the network 104 destined for one of the plurality of input-output ports 101. The aggregation module 102 separates the received aggregated data packets according to the destination identifier contained in each packet. The aggregation module 102 separates the received data packets by diverting the received data packets to the data channel corresponding to the destination identifier. A remote router 106, physically remote from the data aggregator 102, is coupled to the PSTN 104 and provides a routing function of data received from the aggregation module 102 via the PSTN 104 and of data to be transmitted to the aggregation module 102 via the PSTN 104. The remote router 106 can route the output data packets received therefrom to various data networks 103 such as an internet, a high speed intranet, or other high speed data networks.

In order to provide fractional high capacity data communications services, the number of the plurality of input-output ports is greater than the data rate capacity of the network 104 divided by the full-lot bandwidth. In the illustrated embodiment, the network 104 is the PSTN operating at 10 GBPS, and each input-output port is a Gigabit Ethernet (GBE) input-output port operating at 1 GBPS. Accordingly, the number of input-output ports will be greater than ten. Therefore, at least some of GBE input-output port would provide input-output data at a rate that is a fraction of the 1.0 GBPS GBE link data rate. For example, if there were 16 GBE input-output ports, and each port were allocated an equivalent portion of the 10 GBPS bandwidth, then each port could support up to 625 MBPS. However, in all of the embodiments described herein, each input-output port does not need to be allocated an equivalent portion of the available bandwidth.

Although the illustrated embodiment discussed herein are GBE links, fractional high capacity data communications systems are not limited to only GBE links. Other digital networks can be used, for example, Fibre Channel storage networks, ESCON data storage arrays, Infiniband data storage applications, and a Digital Video Broadcast (DVB) Asynchronous Serial Interface could also make use of the apparatus and methods described herein.

In general, the aggregator module 102 can include one or more link layer devices that are interfaced and coupled to a physical layer device in a point-to-point connection scheme. The interfaces between a given link layer device and the physical layer device are described in the Optical Internetworking Forum standard System Packet Interface (SPI) level-4, phase 2, ("SPI-4.2SPI-4.2.2"). The SPI-4.2 standard is referred to as OIF-PLL-04.0 and may be found on the website of the Optical Internetworking Forum group, www.oiforum.com. The SPI-4.2 interface is a 16 bit parallel interface, where each parallel bit is switched at 800 MHz for an overall data rate of 12.8 GBPS the approximate data rate of the PSTN. Modifying existing link layer SPI-4.2 devices as described herein presents an efficient means to provide the fractional data rates to a plurality of users.

Figure 2:
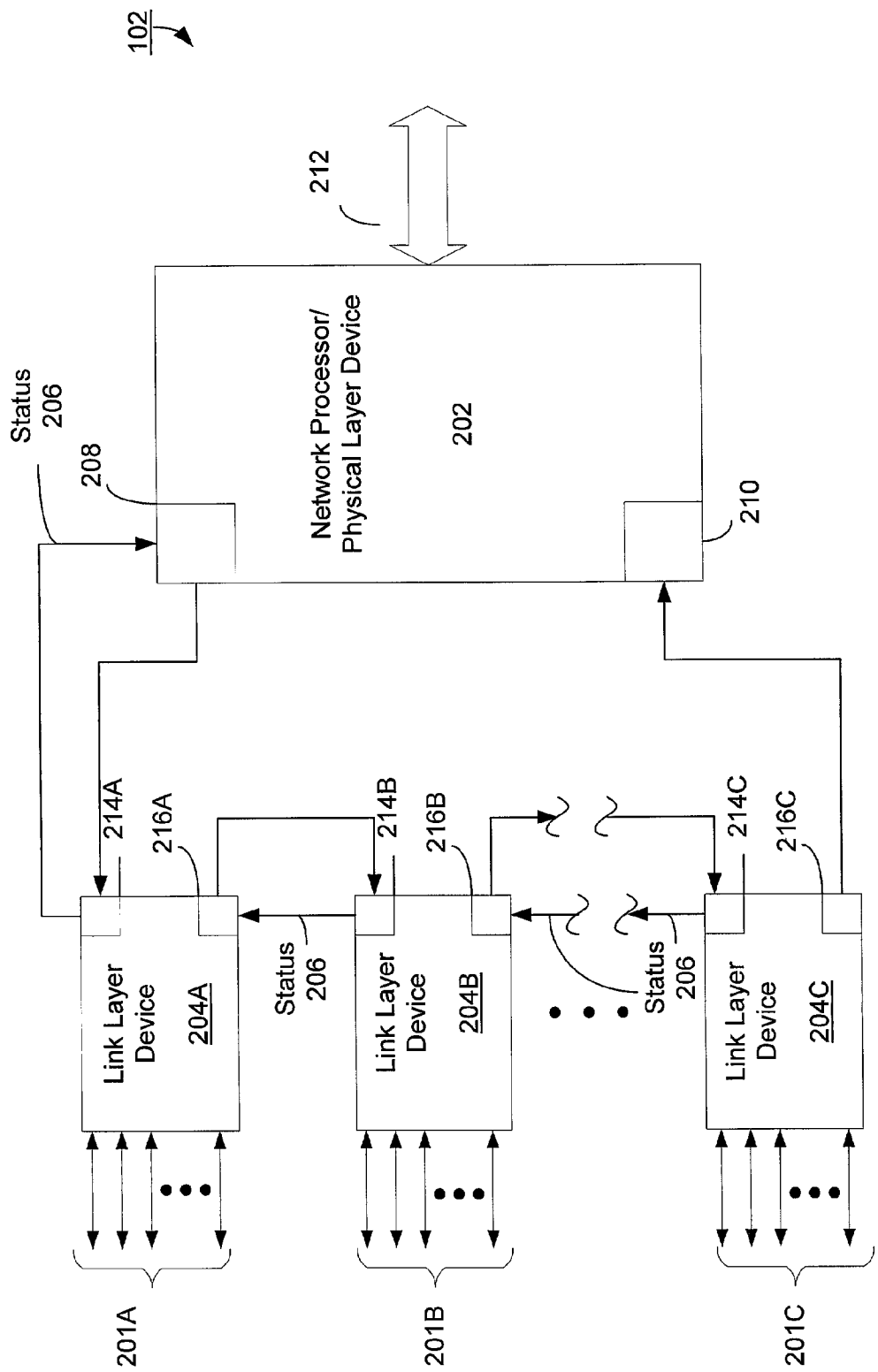
FIG. 2 is a block diagram providing additional details of the aggregation module depicted in FIG. 1.

FIG. 2 depicts one embodiment of the data aggregation module 102. In particular, the data aggregation module 102 includes a plurality of link layer devices 204A, 204B, and 204C each of which is coupled to a plurality of input-output ports 201A, 201B, and 201C respectively. Each of the plurality of input-output ports may support a full lot data rate, or the particular input-output port may support a data rate that is a fraction of full lot data rate. As depicted in FIG. 2, link layer device 204A has n input-output ports 201A, link layer device 204B has m input-output ports 201B, and link layer device 204C has p input-output ports 201C. For example, if a n=16 with an aggregated bandwidth of 4.8 GBPS, m=14 with an aggregate bandwidth of 3.2 GBPS, and p=4 with an aggregate bandwidth of 1.8 GBPS, a total of 34 end users would be providing 9.8 GBPS bandwidth. Each of the plurality of input-output ports associated with each link layer devices 204A, 204B, and 204C has a corresponding unique identifier such that each input-output port has a unique port identifier over all of the link layer devices 204A–204C.

A network processor, physical layer device, or link layer device }"data device") 202 is also provided. The data device 202 includes a data output port 208, a data input port 210, and a high capacity data aggregation output port 212. The high capacity data aggregation output port 212 transmits and receives aggregated data at a high capacity data rate to and from a high capacity data network (not shown). As discussed above, the sum total of the data rate bandwidth for all of the input-output ports of all of the link level devices 204A–204C does not usually exceed the total available data rate bandwidth of the high capacity data rate. As such, at least some of the input-output ports 201A–201C are allocated only a fraction of the full unit available bandwidth. In addition, the number of full rate ports that can be aggregated into a single high-capacity link can be expanded as well. Multiple link layer devices can be connected such that multiple full rate channels can be aggregated into a single higher-capacity link.

In the embodiment depicted in FIG. 2, each of the plurality of link layer devices 204A, 204B, and 204C are connected in a serial daisy chain fashion. Each of the plurality of link layer devices 204A–204C receives data from an adjacent upstream link layer device and provides data to an adjacent downstream link layer device. The data within each link layer device, and between each link layer device is provided via a plurality of data channels, wherein each of the plurality of data channels corresponds to one of the plurality of input-output ports 201A–201C. As used herein, downstream refers to the direction of data flow, and upstream refers to the direction opposite to the direction of data flow. As will be explained in more detail below, the plurality of data channels however, are not physical channels but rather are virtual data channels since there are no separate data connections for each channel. In one embodiment, all data that is physically passed between adjacent link layer devices is passed on a multi-bit parallel data bus according to the SPI-4.2 standard.

In particular, the first link layer device 204A has a data receiver 214A coupled to the output port 208 of the data device 202. The first link layer device 204A receives a plurality of data packets from the data device 202, wherein each of the plurality of data packets includes a unique destination identifier. The first link layer device 204A receives the plurality of data from the data device 202 via the data receiver 214A. The first link layer device 204A is configured and arranged to divert each received data packet to the particular virtual data channel corresponding to the destination identifier. If the destination identifier of the received data packet corresponds to one of the unique input-output port identifiers associated with the first link layer device 204A, the received data packet is coupled to that particular input-output port. A data transmitter 216A is coupled to each virtual data channel and receives the data packets that have not been coupled to an input-output port 201A associated with the first link layer device 204A. The data transmitter 216A is further coupled to data packets that have been generated by the first link layer device 204A. The data transmitter 216A is configured and arranged to access each virtual data channel in a manner designed to efficiently retrieve the data packets in each channel. The data transmitter 216A is further configured and arranged to transmit the plurality of data packets to the data receiver 214B of the second link layer device 204B.

In general, the number of input and output ports within a link layer device will be equal, although this is not a requirement. The system described herein can work with systems having an unequal number of input and output ports as well. For an aggregation module having a total of X input-output ports, there can be at most X virtual data channels between adjacent link layer devices. Within a particular link layer device having N input-output ports, there will be at most X-N internal virtual data channels, and if there are fewer than X virtual channels in a particular device, there will be concomitantly fewer internal data channels. The internal virtual data channels are based on the link layer device having N channels dropped that correspond to the N output ports, and N channels added that correspond to the N input ports. In some instances there may be the number of input ports may be more or less than the number of output ports in a particular link layer device. In this instance, the total number of virtual data channels entering a link layer device can be different than the total number of virtual data channels leaving the particular link layer device.

Each subsequent link layer device operates as described above. Each link layer device receives incoming data and diverts that data to a virtual data channel corresponding to the destination identifier. The virtual data channel may either be coupled to an output port associated with the particular link layer device, or provided to an adjacent link layer device. The last link layer device 204C operates as described above, but instead of providing the data to a subsequent link layer device, the last link layer device 204C forwards data packets that are not coupled to an input-output port associated therewith to the input port 210 of the data device 202 via the data transmitter 216C.

As discussed above, each of the plurality of data channels is a virtual data channel only. However, for the purposes of data flow control, each virtual channel appears to be a separate independent data connection between adjacent upstream link layer devices. As described in more detail below, the use of virtual data channels in data flow control prevents a blockage of data on one data channel from disrupting the flow of data on other downstream channels to other input-output ports. As used herein, a virtual data channel extends across all of the link layer devices and includes the particular output port. Flow control of the data contained in each virtual data channel passed between adjacent downstream link layer devices is controlled by a plurality of status indicators 206 that are passed to adjacent upstream link layer devices.

Each of the plurality of status indicator 206 corresponds, to one of the plurality of data channels. The plurality of status indicators 206 provide indicia as to the condition of the corresponding data channel to accept or not accept current data. in one embodiment, each of the plurality of status indicators 206 is generated within each link layer device. Thus, the status for each of the plurality of data channels is regenerated in each link layer device. Accordingly, the status indicators generated by one link layer device are passed only to the adjacent upstream link layer device, where the status for each status indicator is generated anew. In this way, in the event a blockage occurs on a particular virtual data channel within a particular link layer device, the change in the status indicator corresponding to the blocked virtual data channel will propagate upstream only as fast as the effect of the blockage on upstream link layer devices. In each link layer device data transmitter contained therein is configured and arranged to stop transmitting the data associated with a virtual data channel that has a status indicator that indicates a data blockage problem.

Figure 3:
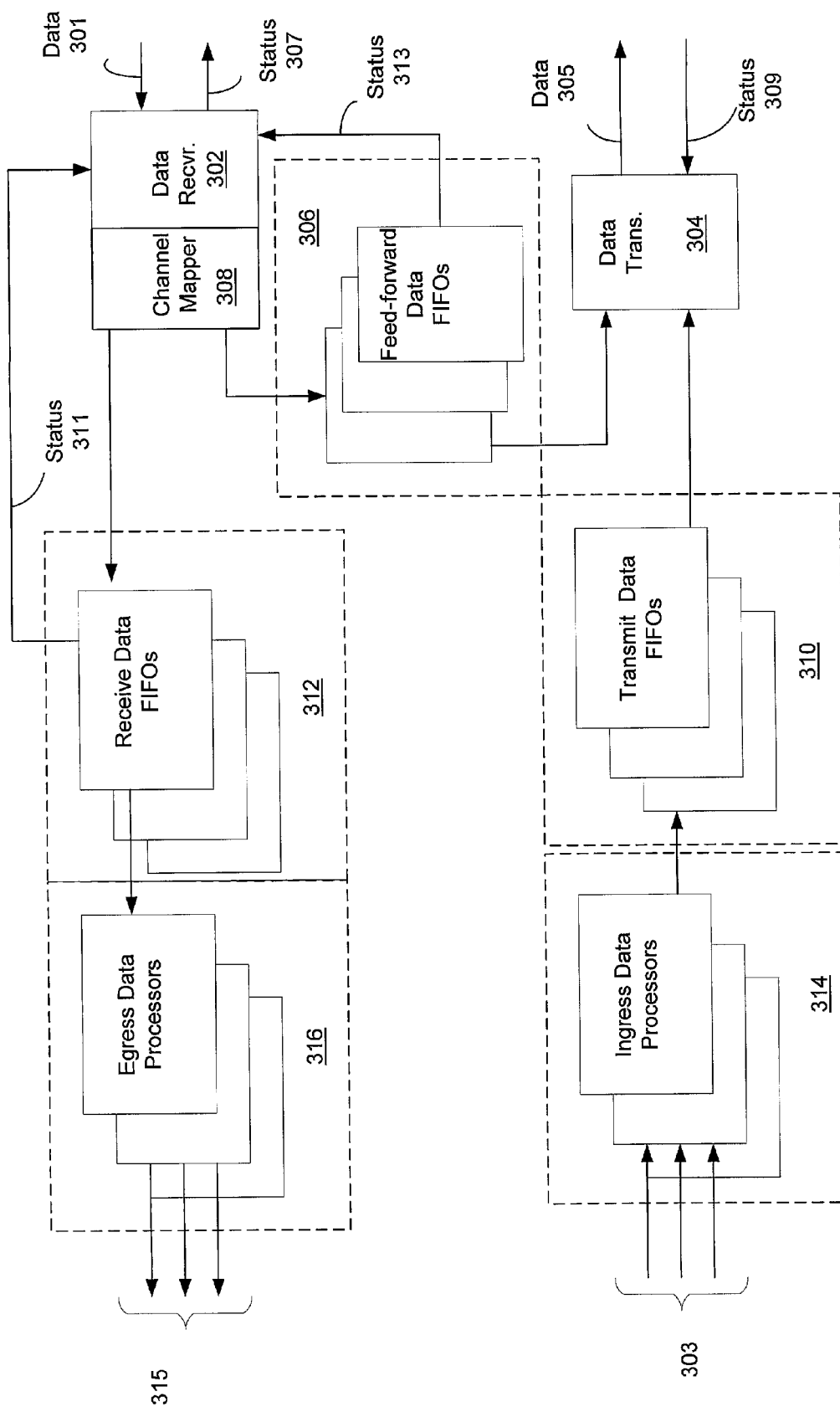
FIG. 3 is a block diagram providing additional details of a link layer device depicted in FIG. 2.

FIG. 3 depicts one embodiment of a link layer device 204 that is representative of the link layer devices 204A–204C. In particular, a link layer device 204 includes a data receiver 302 that is coupled to a data device via an input data line

301. In the illustrated embodiment the input data line 301 is a 16 bit wide parallel data line operating with an 800 MHz clock. The data receiver 302 detects the incoming data signals and provides a detected data signal that is properly filtered and conditioned for subsequent processing. The detected and conditioned data signals are provided to a channel mapper 308 as a plurality of detected data packets, wherein each data packet has a destination identifier portion and a data portion. The channel mapper includes a logical map of each of the various input-output ports and their respective unique port identifiers associated with the each of the link level devices. The channel mapper 308 is configured and arranged to divert the received data packets to the data channel corresponding to the destination identifier. In the event that the destination identifier corresponds to one of the unique input-output port identifiers associated with the particular link layer device, the channel mapper diverts the corresponding data packet to the virtual data channel that includes the received data FIFO 312 associated with and coupled to the corresponding input-output port 315. Each of the received data FIFOs 312 is coupled to an egress processor 316 that provides the interface to the corresponding output port 315. In one embodiment, the egress processor 316 is a media access controller (MAC) device. As discussed above, the egress processor routes various packets to different virtual channels depending upon the header information. However in one-embodiment, packets having different header data may be routed to the same virtual channel, thus, there may be fewer virtual channels than physical channels and accordingly, there does not have to be a 1:1 correspondence between the virtual channels and the physical channels. In another embodiment, data packets may be copied and routed to more than one virtual channel, accordingly, there may be a greater number of virtual channels than physical channels.

The other data packets that do not have destination identifiers corresponding to any input-output ports associated with the particular link layer device are provided to the feed-forward FIFOs 304 corresponding to the appropriate virtual data channel.

A data transmitter 304 is coupled to each of the plurality of feed-forward FIFOs 306, and is further coupled to a plurality of transmit data FIFOs 310. The transmitter 304 retrieves the data stored in the respective FIFOs, and transmits the retrieved data to the data receiver in the adjacent down-stream link layer device via output data line 305.

The plurality of transmit data FIFOs 310 receive data from one of the plurality of the ingress data processors 314, each of which is coupled to a particular input port 303. The ingress data processors 314 receives data from the corresponding input port 303 and formats the data into one or more data packets, wherein each data packet includes at least a destination identifier portion and data portion. The ingress data processor 314, which can be a MAC device, provides the data packet to the one of the plurality of transmit data FIFOs 310 that is part of the virtual channel that corresponds to the destination identifier contained in the packet. The plurality of transmit data FIFOs 310 provide for storage and forwarding of the data stored therein to the data transmitter 304. The data transmitter 304 retrieves the data stored in the plurality of feed-forward FIFOs 306 and the plurality of transmit data FIFOs 310 and provides the retrieved data on an output data line 305. The data added and dropped by a particular link layer device may either be symmetric or asymmetric. If symmetry in the add/drop data is desired, then each link layer device can only add as much data as is dropped and the net effect on the overall data rate bandwidth of the aggregation module is zero. If asymmetry in the add/drop data is allowed then a given link layer device may have more data added than dropped or more data dropped than added. This is allowed so long as the aggregate data rate in any path exceeds the maximum data rate bandwidth of the system.

As discussed above, data flow control among the link layer devices is provided on a per virtual data channel basis by a corresponding status indicator. This per-channel data flow control prevents a single data channel blockage from disrupting the data transmission to other downstream virtual data channels and input-output ports. As discussed above, each virtual data channel in a link layer device includes either a feed-forward FIFO 306 or the receive data FIFO 312 that are part of the same virtual data channel. Status indicators providing indicia of "data pass" and "data no-pass" are generated by each of the plurality of feed-forward FIFOs 306 and receive data FIFOs 312 in each link layer device based on the amount of data stored in the corresponding FIFO. Thus, each virtual data channel in each link layer device will generate one status indicator based on whether the virtual data channel within the link layer device included a received data FIFO 312 or a feed-forward data FIFO 306. If a data blockage occurs on one virtual data channel, each receive data FIFO 312 or feed-forward FIFO 306 will accumulate data beyond a predetermined level. The status signal corresponding to the particular channel, i.e., the particular feed-forward FIFO 306 or receive data FIFO 312, is changed from "data pass" to "data no-pass". The status indicator is provided to the data receiver 302 via status line 313 or status line 311 respectively, and transmitted upstream to the adjacent link layer device via status line 307. The presence of the various FIFOS 306, 310, and 312 allows the bandwidth of the I/O module ports to exceed the aggregated bandwidth of the high-capacity port for a short period of time, until the various FIFO's are filled with data and provide the data no-pass status signal.

Other embodiments may include the plurality of feed-forward FIFOs 306 being replaced by a single multiplexed feed-forward FIFO. Similarly, the plurality of receive data FIFOs 312 or the transmit data FIFOs 310 may be replaced by a single multiplexed FIFO as well. Although separate unidirectional input ports 315 and output ports 303 are depicted, along with the corresponding ingress and egress processors 316 and 314 respectively, bi-directional input-output ports may be used. A bi-directional processor for one or more input-output ports may be used as an interface to the input-output port, or multiplexed ingress and egress processors may be used to interface to the bi-directional input-output ports.

Those of ordinary skill in the art should further appreciate that variations to and modification of the above-described methods, apparatus and system for providing fractional data rates to end users may be made without departing from the inventive concepts disclosed herein. Accordingly, the invention should be viewed as limited solely by the scope spirit of the appended claims.

What is claimed is:

1. A link layer device including at least one unique identifier associated therewith, an input data line for receiving a plurality of received data packets, each of the plurality of data packets including a destination identifier and a plurality of data, the link layer device comprising:

a data receiver coupled to the input data line;
a channel mapper coupled to the data receiver;
a received data FIFO coupled to the channel mapper;
a feed-forward data FIFO coupled to the channel mapper;

the channel mapper receiving the plurality of received data packets and being configured and arranged to divert the received data packets, having a destination identifier equivalent to the unique destination identifier, to the received data FIFO, and to divert the remaining plurality of received data packets to the feed-forward data FIFO;

a transmitter data FIFO containing a plurality of data packets to be transmitted, each of the plurality of data packets to be transmitted having a destination identifier and a plurality of data; and a data transmitter having an output coupled to an output data line, and an input coupled to the feed-forward data FIFO and to the transmitter data FIFO, the data transmitter configured and arranged to retrieve data packets from the feed-forward data FIFO and the transmitter data FIFO and to transmit the retrieved data packets on the output data line.

2. The link layer device of claim 1 further including an egress processor coupled to the received data FIFO and further coupled to a plurality of data ports, the egress processor configured and arranged to provide the received data packets contained in the received data FIFO to one of the plurality of data ports.

3. The system packet interface of claim 1 further including a data ingress processor coupled to the transmitter data FIFO and further coupled to a plurality of data ingress lines, the ingress processor configured and arranged to receive a plurality of data packets from the plurality of data ingress lines and to provide the received plurality of data packets as a plurality of data packets to be transmitted to the transmitter data FIFO.

4. The system packet interface of claim 1 wherein the output data line includes a plurality of output data lines.

5. The system packet interface of claim 1 wherein the input data line includes a plurality of input data lines.

6. The system packet interface of claim 1 wherein the data transmitter is further coupled to a status line corresponding to the data output line and providing status indicia of a "data pass" "data no-pass" condition on the corresponding data output line, in the event the status indicia is "data no-pass" the data transmitter responsive to the status indicia by stopping transmission of data on the corresponding output data line, in the event the status indicia is "data pass" the data transmitter responsive to the status indicia by continuing transmission of data on the corresponding output data line.

7. A system for aggregating a plurality of input and output ports to a data device, the data device including a data output port and a data input port, the data device having a maximum data rate, the system comprising:

first and second link layer devices, each link layer device including:
an assigned unique destination identifier, an input data line for receiving a plurality of received data packets, each of the plurality of data packets including a destination identifier and a plurality of data;
a data receiver coupled to the input data line;
a channel mapper coupled to the data receiver;
a received data FIFO coupled to the channel mapper;
a feed-forward data FIFO coupled to the channel mapper;
the channel mapper receiving the plurality of received data packets and being configured and arranged to divert the received data packets, having a destination identifier equivalent to the assigned destination identifier, to the received data FIFO, and to divert the remaining plurality of received data to the feed-forward data FIFO;

a transmitter data FIFO containing a plurality of data packets to be transmitted, each of the plurality of data packets to be transmitted having a destination identifier and a plurality of data;

a data transmitter having an output coupled to an output data line, and an input coupled to the feed-forward data FIFO and to the transmitter data FIFO, the data transmitter configured and arranged to retrieve data packets from the feed-forward data FIFO and the transmitter data FIFO and to transmit the retrieved data packets on the output data line;

an egress processor coupled to the received data FIFO and further coupled to a data output port, the egress processor configured and arranged to provide the received data packets contained in the received data FIFO to the data output ports;

a data ingress processor coupled to the transmitter data FIFO and further coupled to a data input port, the ingress processor configured and arranged to receive a plurality of data packets from the data input port and to provide the received plurality of data packets, as a plurality of data packets to be transmitted, to the transmitter data FIFO;

the input data line of the first link layer device coupled to the output port of the data device;

the output data line of the of the first link layer device being coupled to the input line of the second link layer device;

the output data line of the second link layer device being coupled to the input port of the data device;

wherein, the aggregate data rate of the first and second link layer devices is less than the maximum data rate of the data device.

8. The system of claim 7 further including a first status signal provided by the second link layer device, the first status signal coupled to a status line corresponding to the data output line and providing status indicia of a "data pass" "data no-pass" condition on the corresponding data output line; and the status line coupled to the data transmitter of the first link layer device, in the event the status indicia is "data no-pass" the data transmitter of the first link layer device being responsive to the status indicia by stopping transmission of data on the corresponding output data line, in the event the status indicia is "data pass" the data transmitter of the first link layer device being responsive to the status indicia by continuing transmission of data on the corresponding output data line.

9. The system of claim 8, wherein the status signal is generated by the received data FIFO and the feed-forward data FIFO and is indicative of the amount of data stored respectively therein.

10. The system of claim 7 wherein the data device is selected from the group of network processor, physical layer device, and link layer device.

* * * * *